Figure 1:
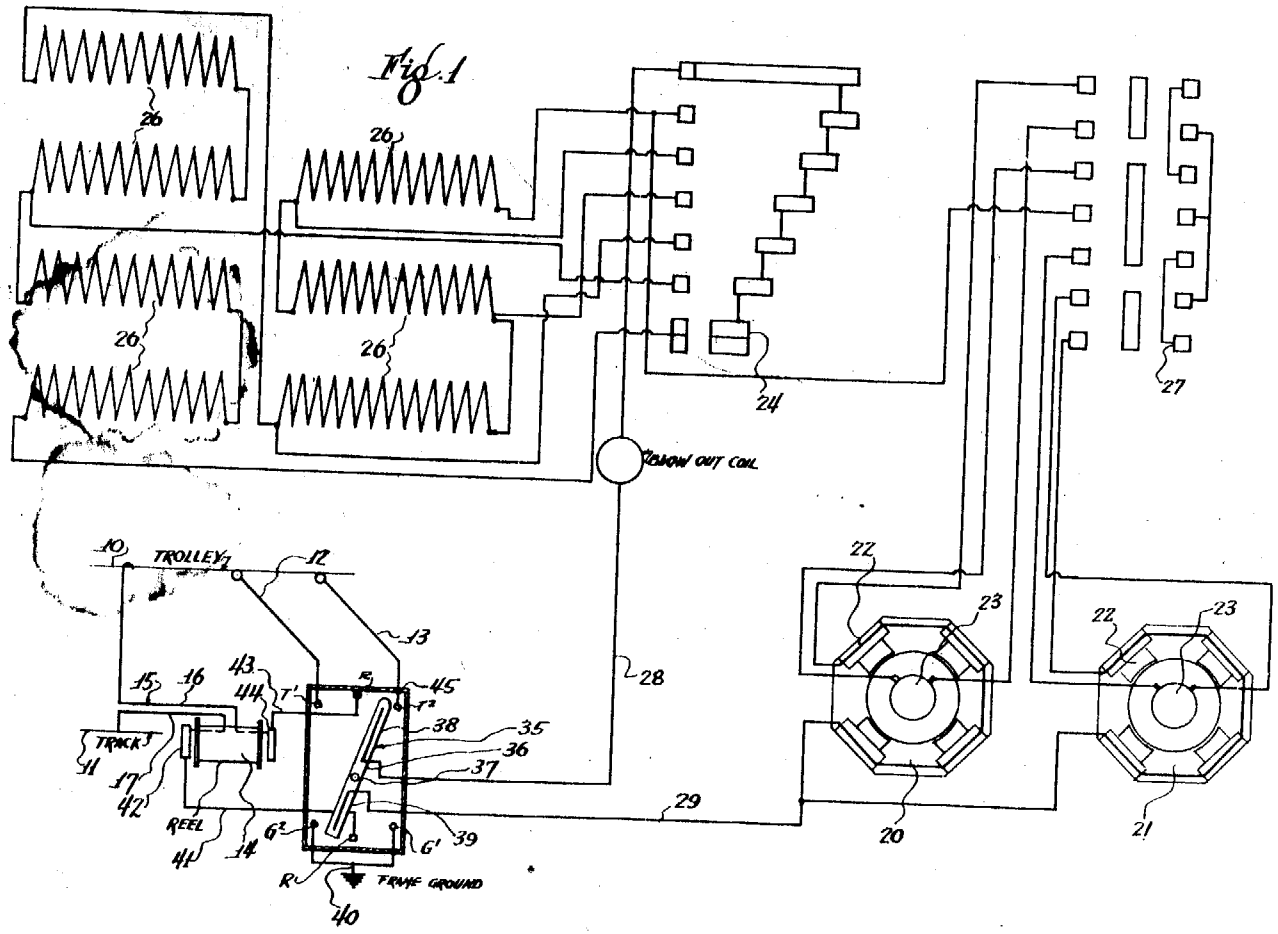

91. ELECTRICITY- TRANSMISSION
TO VEHICLES,

3

Examin

Aug. 9, 1927.

S. W. FARNHAM

Re. 16,700

LOCOMOTIVE

Original Filed Dec. 26, 1924

Witness
Herbert Buehler

Inventor
Sidney W. Farnham
by Clarence D. Poole
Attorney

ELECTRICITY TRANSMISSION
TO VEHICLES,

Reissued Aug. 9, 1927. Re. 16,700

UNITED STATES PATENT OFFICE.

SIDNEY W. FARNHAM, OF CHICAGO, ILLINOIS, ASSIGNOR TO GOODMAN MANUFACTURING COMPANY, OF CHICAGO, ILLINOIS, A CORPORATION OF ILLINOIS.

LOCOMOTIVE.

Original No. 1,558,971, dated October 27, 1925, Serial No. 758,023, filed December 26, 1924. Application for reissue filed April 6, 1927, Serial No. 181,578.

This invention relates to improvements in mine locomotives and more particularly to combined trolley and gathering locomotives in which the locomotive may be operated selectively by power obtained through one or more trolleys or through gathering reel of the usual type having a conductor cable wound thereon and adapted to be detachably connected to the power lines in a main transportation entry while the locomotive is being operated over unwired tracks as for instance branch tracks extending into remote portions of a mine.

The purpose of this invention is to provide means for preventing sparking between the locomotive wheels and the rail while the power is being supplied through the cable reel so that the locomotive can be safely operated with the reel connections in remote portions of the mine where explosive gas is likely to accumulate and form a potent source of danger from sparks ordinarily caused by the returning current from the power line passing through the locomotive wheels and from them to the mine tracks.

My invention may be best understood by reference to the accompanying drawings in which:

Figure 1 is a diagrammatic view illustrating one embodiment of my invention as applied to an electric locomotive.

In these drawings, 10 indicates a main power supply line such as a trolley wire and 11 indicates a track forming a power return. It is understood that the trolley and track extend along main transportation lines which are usually well ventilated so as to eliminate any danger of explosions such as might be caused by the operation of an electric motor.

The remaining portions of the diagrams indicate parts mounted upon an electric locomotive of the combined trolley and gathering reel type.

In the form shown the locomotive is provided with two trolley poles 12 and 13, and a gathering reel 14 having a cable 15 of the duplex type including two leads 16 and 17. These leads are provided with suitable terminal devices of the usual character for engagement respectively with the trolley 10 and track 11. These devices need not be shown in detail as they are well known and form no part of the present invention. The locomotive is also provided with a pair of motors 20 and 21, having the usual field windings 22, 22, and armatures 23, 23. The motors are controlled by any suitable controlling device such as a control drum 24 having resistances 26, 26, associated therewith in any suitable manner, and a reversing drum 27 suitably connected for reversing the direction of current through the motors. Details of these controlling devices need not be described for the purpose of the present invention excepting to point out a main lead 28 leading to the control drum and a second lead 29 leading to the field windings 22, 22. These latter leads are adapted to complete the circuit from the source of supply.

In electric locomotives of this type adapted to receive power from either one of two trolley poles, such as the poles 12 and 13 and from an electric conductor or gathering reel such as the reel 14, an independent three-way switch is usually provided so as to render two of the supply sources dead or disconnected when the third is in operation. In the present invention I provide an additional switch or set of contacts in which the return connection of the motor circuit is made to a ground upon the frame of the locomotive when operating from one or the other of the trolleys and another connection, unconnected, electrically, with the locomotive frame, is made from the motor return circuit to one side of the gathering reel and thence directly through the conductor cable when operating through the reel. In the form shown this switch is indicated generally at 35 and comprises a contactor arm 36 pivotally connected at 37 to one of the main motor circuit leads 28. The upper end 38 of this switch is adapted to engage with a plurality of contacts $T^1$, $T^2$, or R. The lower end 39 of this switch member is adapted to engage with contacts $G^1$, $G^2$, or $R^1$, the arrangement being such that the circuit is completed either from $T^2$ to $G^2$, R to $R^1$, or $T^1$ to $G^1$. The two contacts $G^1$ and $G^2$ have a common connection to the frame of the locomotive. Thus it will be seen that when the switch is connected with either of the trolleys 12 and 13 by engaging their respective contacts $T^1$ or $T^2$, as the case may be, the motor circuit is completed through the respective ground connections $G^1$ or $G^2$, to the locomotive frame at point 40. Thus while the locomotive is operating over the main tracks with either of the trolleys in engagement with the main supply line, the ground connection is provided in the usual way through the locomotive frame and track wheels to the track 11. On the other hand when it is desired to supply current through the trolley reel, the switch member 36 is rotated to connect with contacts R and $R^1$, in which case the return connection from the lead 29 is connected to a conductor 41 having engagement with a contactor ring 42 carried by the reel and connected to one of the cable conductors 17. The other motor lead 28 is connected through a conductor 43 to a contacting ring 44 on the reel connected with the other cable conductor 16. Thus the motor circuit is wholly disconnected from the frame, and the possibility of arcing between the locomotive wheels and the track is entirely eliminated when the power is being supplied through the cable reel. It is preferable in locomotives of this character to enclose the operating parts of the locomotive wherein arcs are likely to occur as well as the conductor rings on the gathering reel. Similarly the switching device is enclosed as for instance indicated by the casing 45 shown in the diagram surrounding the switching device 35.

From the above description it will be understood that the locomotive may be operated in the usual manner with a ground return from the motor passing through the locomotive frame and wheels and the return track, without danger of causing explosions since the main haulage entries are usually sufficiently ventilated to eliminate danger from explosive gases. However, when operating on the gathering reel in remote portions of the mine where the ventilating system is not so effective, my improved switching device automatically provides a return circuit through the duplex cable reel instead of through the locomotive ground on the locomotive frame and the mine tracks and thus providing a safeguard against explosions in the more dangerous areas of the mine.

While I have shown and described one embodiment of my invention, it will be understood that the construction and arrangement of the various parts may be altered without departing from the spirit and scope thereof. Furthermore, I do not wish to be interpreted as limiting myself to the particular construction illustrated, excepting as it may be specifically limited in the appended claims.

I claim as my invention:

1. In a gathering locomotive provided with control and reverse drums, and with a motor circuit adapted to be selectively connected with a source of power supply through a trolley or a gathering reel, a double conductor cable and rotating contactor devices associated with said gathering reel, and switching means independent of said reverse drum for completing said motor circuit through the trolley and a ground connection on the locomotive frame in one position, and completing the circuit through the double conductor cable and contact devices on the gathering reel, when in a second position, said last named circuit being wholly disconnected from said locomotive frame.

2. In a gathering locomotive provided with control and reverse drums, and with a motor circuit adapted to be selectively connected with a source of power supply through a trolley or a gathering reel, a double conductor cable and rotating contactor devices associated with said gathering reel, a set of contacts including one connected to the trolley and another to a ground connection on the locomotive frame, a separate set of contacts electrically connected with said contactor devices and entirely unconnected with said locomotive frame, and switching means separate from said reverse drum for selectively completing said motor circuit through either said first set of contacts or said second mentioned set of contacts, as desired.

Signed at Chicago, in the county of Cook and State of Illinois, this 4th day of April, A. D. 1927.

SIDNEY W. FARNHAM.